(12) United States Patent
Ono et al.

(10) Patent No.: US 8,678,719 B2
(45) Date of Patent: Mar. 25, 2014

(54) CUTTING TIP, METHOD OF FORMING CUTTING TIP, AND METHOD OF MANUFACTURING CUTTING TIP

(75) Inventors: Naoto Ono, Anjo (JP); Shinji Soma, Handa (JP); Yasuo Niino, Toyokawa (JP); Tomokazu Yamashita, Nishio (JP)

(73) Assignee: JTEKT Corporation, Osaka-shi (JP)

( * ) Notice: Subject to any disclaimer, the term of this patent is extended or adjusted under 35 U.S.C. 154(b) by 1072 days.

(21) Appl. No.: 12/674,056

(22) PCT Filed: Jun. 5, 2008

(86) PCT No.: PCT/JP2008/060339
§ 371 (c)(1),
(2), (4) Date: Feb. 18, 2010

(87) PCT Pub. No.: WO2009/031348
PCT Pub. Date: Mar. 12, 2009

(65) Prior Publication Data
US 2010/0202840 A1     Aug. 12, 2010

(30) Foreign Application Priority Data

Sep. 6, 2007 (JP) ................................. 2007-232103
Mar. 26, 2008 (JP) ................................. 2008-080865

(51) Int. Cl.
*B23B 27/14*     (2006.01)

(52) U.S. Cl.
CPC ..................................... *B23B 27/14* (2013.01)
USPC ........................................... 407/119; 407/118

(58) Field of Classification Search
USPC ............................................ 407/32, 118, 119

IPC ................. B23C 5/18,5/20; B23B 27/14, 27/20
See application file for complete search history.

(56) References Cited

U.S. PATENT DOCUMENTS 2,019,934 A * 11/1935 Schroter et al. ............... 407/118
3,800,380 A *  4/1974 Cline et al. .................... 407/118
(Continued)

FOREIGN PATENT DOCUMENTS

EP          0 067 222 B1     1/1987
EP          0 480 394 A2     4/1992
(Continued)

OTHER PUBLICATIONS

A.G.P. da Silva et al., The Role of the Binder Phase in the WC-Co Sintering, Nov. 16, 2000, Universidade Federal do Rio Grande do Norte, Brazil.*

(Continued)

*Primary Examiner* — Daniel Howell
*Assistant Examiner* — Alan Snyder
(74) *Attorney, Agent, or Firm* — Oblon, Spivak, McClelland, Maier & Neustadt, L.L.P.

(57) ABSTRACT

A cutting tip including a cutting edge portion made of a high-hardness material to take a thin-plate shape; and a support portion made of a material which is more worn in contact with a workpiece than the cutting edge portion not to exert a machining action on the workpiece even in contact with the workpiece, and securing and supporting the cutting edge portion on a reverse side of a rake face of the cutting edge portion. Thus, the width of flank wear is prevented from increasing and chipping of the cutting edge is prevented, so that the life of the cutting tip can be extended.

13 Claims, 11 Drawing Sheets

(56) References Cited

U.S. PATENT DOCUMENTS

| | | | |
|---|---|---|---|
| 4,627,317 A * | 12/1986 | Komanduri et al. | 82/1.11 |
| 4,859,541 A * | 8/1989 | Maxeiner et al. | 428/545 |
| 5,135,061 A * | 8/1992 | Newton, Jr. | 175/428 |
| 5,171,720 A * | 12/1992 | Kawakami | 501/80 |
| 5,387,474 A * | 2/1995 | Mikeska et al. | 428/688 |
| 5,921,725 A * | 7/1999 | Kashiwagi et al. | 407/119 |
| 6,231,277 B1 * | 5/2001 | Abukawa | 407/119 |
| 8,133,576 B2 * | 3/2012 | Omori et al. | 428/212 |
| 2001/0003569 A1 * | 6/2001 | Ota et al. | 407/118 |
| 2004/0164442 A1 * | 8/2004 | Olsson et al. | 264/113 |
| 2006/0147280 A1 * | 7/2006 | Sjogren et al. | 407/113 |
| 2007/0248424 A1 * | 10/2007 | Omori et al. | 407/113 |
| 2008/0226943 A1 * | 9/2008 | Fang et al. | 428/697 |
| 2010/0028699 A1 * | 2/2010 | Lenk et al. | 428/472 |

FOREIGN PATENT DOCUMENTS

| | | |
|---|---|---|
| EP | 0 514 894 A2 | 11/1992 |
| EP | 0 541 071 A1 | 5/1993 |
| JP | 5 16014 | 1/1993 |
| JP | 9 239631 | 9/1997 |
| JP | 10 249610 | 9/1998 |
| JP | 11 61316 | 3/1999 |
| JP | 2004 291126 | 10/2004 |

OTHER PUBLICATIONS

Extended European Search Report issued May 10, 2012, in Patent Application No. 08765152.7.

Japanese Office Action issued Oct. 2, 2012 in Patent Application No. 2009-531153 with English Translation.

* cited by examiner

CUTTING TIP, METHOD OF FORMING CUTTING TIP, AND METHOD OF MANUFACTURING CUTTING TIP

TECHNOLOGICAL FIELD

The present invention relates to a cutting tip used in cutting machines such as lathe, milling machine or the like and a forming method and a manufacturing method of the cutting tip.

BACKGROUND ART

Generally, in cutting tips used in cutting machines, many of those use a cemented carbide increased in toughness and hardness as the material for the cutting tips, and with the details in operation taken into consideration, it is unavoidable that the cutting edges are worn away with lapse of machining time. Further, there arises a problem that after being worn away, the cutting tips get the edge shapes changed to increase cutting resistance due to an increase of a contact area with a workpiece and that defects such as chipping occur in due course thereby to reach the end of the service life in a relatively short period of time. In order to solve such a problem, materials for cutting tips have heretofore been improved, as described in JP 11-61316 A.

Problem to be Solved by the Invention

However, there are limitations in improving materials to enhance an anti-chipping capability, and the use of a cutting tip for a long period of time results in chipping of the cutting edge in due course. That is, as shown in FIG. 17, a cutting tip 39 in the prior art is made of a cemented carbide which wholly takes tungsten carbide WC as chief ingredient, and when at the time of machining a workpiece W, an acute edge portion P of the cutting tip is pushed against the workpiece W to perform a machining, the wear progresses in due course to increase the width of flank wear, as indicated at $V_{B1}$, $V_{B2}$ and $V_{B3}$ in the figure. As the contact area between the cutting tip 39 and the workpiece W expands with an increase in the width of flank wear, the cutting resistance increases in dependence thereon to increase forces F1 and F2 which are exerted on the cutting edge of the cutting tip 39 in a direction A and a direction B. Accordingly, since excessive bending and compression stresses are imposed on the cutting tip 39, chipping takes place at a stress concentration portion such as cutting edge or the like.

The present invention has been made to solve the foregoing problem in the past and is intended to provide a cutting tip which is extended in tool life by preventing the width $V_B$ of flank wear from increasing and by preventing chipping of the cutting edge.

Measures for Solving the Problem

In order to solve the aforementioned problem, the feature in construction of the invention in a first aspect resides in comprising a cutting edge portion made of a high-hardness material to take a thin plate shape and a support portion made of a material which is more worn in contact with a workpiece than the cutting edge portion not to exert a machining action on the workpiece even in contact with the workpiece, and securing and supporting the cutting edge portion on a reverse side of a rake face of the cutting edge portion.

The feature in construction of the invention in a second aspect resides in that in the first aspect, the thickness of the cutting edge portion is in the range of 0.2 mm to 2 mm.

The feature in construction of the invention in a third aspect resides in that in the first aspect, the support portion is made of a fragile material.

The feature in construction of the invention the fourth aspect resides in that in the third aspect, the fragile material is a sintered compact with solder and ceramic particles mixed.

The feature in construction of the invention in a fifth aspect resides in that in the first aspect, the cutting edge portion is brazed with solder to the support portion.

The feature in construction of the invention in a sixth aspect resides in that in the first aspect, the edge shape of the cutting edge portion is machined to a shape conforming to a shape to be machined on the workpiece.

The feature in construction of the invention in a seventh aspect resides in that in the first aspect, the cutting edge portion protrudes from the support portion in the range of 0.002 mm to 0.1 mm.

The feature in construction of the invention in an eighth aspect resides in that in the seventh aspect, the support portion is made of a high-hardness material and that the cutting edge portion is in the range of 0.2 to 2 mm in thickness and bodily protrudes from the support portion.

The feature in construction of the invention in a ninth aspect resides in that in a forming method of the cutting tip described in the seventh aspect, an extreme end face of the support portion is machined to be removed to keep a protruding portion in the range of 0.002 mm to 0.1 mm.

The feature in construction of the invention in a tenth aspect resides in that in the first aspect, a lapping finish is implemented on either side or one side of the cutting edge portion.

The feature in construction of the invention in an eleventh aspect resides in that in the first aspect, the cutting edge portion has a hard coat formed on a surface thereof which contacts a workpiece.

The feature in construction of the invention in a twelfth aspect resides in the cutting tip described in the first aspect, wherein the cutting tip is secured on a circumference of a cutting tool body which is rotationally driven.

The feature in construction of the invention in a thirteenth aspect resides in the cutting tip described in the first aspect, wherein the cutting tip is detachably secured to a mounting portion of a cutting tool constituted by the cutting tip and the mounting portion.

The feature in construction of the invention in a fourteenth aspect resides in that in the first aspect, the cutting tip is subjected to a machining to shape an edge of the cutting edge portion on a machining apparatus on which the cutting tip is used.

The feature in construction of the invention in a fifteenth aspect resides in comprising placing a cutting edge portion which is made of a high-hardness material to take a thin plate shape, on a bottom surface of a die, filling and pressing the mixture of ceramic particles and solder on the cutting edge portion placed in the die, and sintering the pressed mixture.

Effects of The Invention

With the invention in a first aspect as constructed above, the high-hardness cutting edge portion taking the thin plate shape is supported by the support portion which does not exert a machining action on the workpiece even in contact with the workpiece, on the reverse side of the rake face. Thus, when the flank of the cutting tip is worn as a result of pushing the cutting tip, comprising the cutting edge portion and the support portion, against a workpiece to perform a machining, the width of the flank at the cutting edge portion becomes constant at all times. Further, since at this time, the support portion which is worn together with the cutting edge portion does not exert a machining action on the workpiece, the cutting resistance which the support portion receives from the workpiece is weak. Thus, the cutting tip mainly receives a cutting resistance depending on the thickness of the thin plate upon contact of the cutting edge portion having a fixed width with the workpiece. Since, as explained here, the contact area between the cutting tip and the workpiece, particularly, the contact area with the cutting edge portion remains constant not to increase and since the cutting resistance remains constant, chipping due to an excessive stress exerted on the cutting edge portion does not take place, so that the life of the cutting tip can be extended.

With the invention in the second aspect as constructed above, in the first aspect, the thickness of the cutting edge portion of the cutting tip is set in the range of 0.2 mm to 2 mm. This is because according to experimental data acquired from repetitive experiments, it is likely that where the thickness of the cutting edge portion is less than 0.2 mm, the lack of strength causes the extreme end portion to fracture. Further, where the thickness is greater than 2 mm, it is likely that the cutting resistance between the cutting edge portion and a workpiece becomes too large when the cutting edge portion is pushed against the workpiece and that the cutting resistance exerts an excessive bending or compression stress upon a part of the cutting edge portion to the degree not to be sustained by the support portion, thereby resulting in occurrence of chipping. Therefore, by setting the thickness of the cutting edge portion in the range of 0.2 mm to 2 mm, it is possible to prevent the fault and to extend the life of the cutting tip.

With the invention in the third aspect as constructed above, in the first aspect, the support portion is made of a fragile material. Thus, when the cutting tip attached to the end of a cutting tool is pushed against a workpiece to perform a cutting, the cutting edge portion and the support portion are worn, and because of being made of the fragile material, the support portion is fragilely broken when a cutting force exceeding a predetermined value acts thereon. Therefore, the support portion can reliably support the cutting edge portion without exerting a machining action on the workpiece. Further, even when the wear of the cutting tip goes on, the width of the flank at the cutting edge portion after wear remains constant at all times. Therefore, since the contact area with the workpiece does not increase and since the cutting resistance also remains not to increase, chipping due to an excess stress exerted on the cutting edge portion does not take place, so that the life of the cutting tip can be extended.

With the invention in the fourth aspect as constructed above, in the third aspect, the fragile material is a sintered compact with solder and ceramic particles mixed. Thus, when the cutting tip attached to the end of a cutting tool is pushed against a workpiece to perform a cutting, the cutting edge portion and the support portion go to be worn, wherein the support portion falls off little by little in a unit of a ceramic particle when a cutting force exceeding the predetermined value acts thereon, so that the support portion can reliably support the cutting edge portion without exerting a machining action on the workpiece. Further, even when the wear of the cutting tip goes on, the width of the flank at the cutting edge portion after wear remains constant at all times. Therefore, since the contact area with the workpiece does not increase and since the cutting resistance also remains constant not to increase, chipping due to an excess stress exerted on the cutting edge portion does not take place, so that the life of the cutting tip can be extended.

With the invention in the fifth aspect as constructed above, in the first aspect, the cutting edge portion and the support portion which constitute the cutting tip take a construction that the cutting edge portion is brazed to the support portion with a solder such as, for example, silver solder, copper solder, nickel solder or the like. Thus, since the cutting edge portion and the support portion are firmly secured to a rigid body, slide or detachment does not occur between the support portion and the cutting edge portion even when the cutting tip is pushed against the workpiece to perform a cutting. Therefore, the support portion can continue as a rigid body at all times to sustain the cutting resistance which the cutting edge portion suffers from the workpiece, and breakage due to the concentration of a stress during the machining of the workpiece on a part of the cutting edge portion does not take place, so that the life of the cutting tip can be extended.

With the invention in a sixth aspect as constructed above, in the first aspect, the edge shape of the cutting edge portion is machined to a shape which conforms to a shape to be machined on the workpiece. This means a so-called formed cutting tool, and thus, the edge of the cutting edge portion machines the workpiece to approximately the same shape as the edge shape. Although being worn with the machining, the cutting edge portion and the support portion are easy to remain in the initial shapes, so that the life of the cutting tip can be extended. Further, it becomes easy to generate the shape of the formed cutting tip, and the generation of an arbitrary shape becomes possible even on the machine. In addition, whenever the alteration of the edge shape is required, such can be done easily, thereby enhancing the efficiency.

With the invention in the seventh aspect as constructed above, in the first aspect, the cutting edge portion is formed to protrude in the range of 0.002 mm to 0.1 mm from the support portion. Thus, when the cutting tip is pushed against a workpiece to perform a cutting, the support portion does not contact the workpiece not to exert a machining action thereon, and even when the wear of the cutting edge portion develops to the thickness in a range between 0.002 mm to around 0.1 mm, the cutting edge portion which is constant in thickness does nothing but goes to be worn, and an increase does not occur in the contact area between the workpiece and the cutting edge portion. Therefore, since the cutting resistance also remains constant not to increase, chipping due to an excess stress exerted on the cutting edge portion does not take place, so that the life of the cutting tip can be extended. The protruding amount in the range of 0.002 mm to 0.1 mm is that acquired through experiments, and if the protruding amount is less than 0.002 mm, it is likely that when the cutting tip is pushed against a workpiece to perform a cutting, the support portion contacts the workpiece to serve for the machining action. Further, if the protruding amount is greater than 0.1 mm, it is likely that when the extreme end portion of the cutting edge portion machines the workpiece, an excess bending stress is generated at a boundary portion between the cutting edge portion and the support portion to result in the breakage of the cutting edge portion. From the foregoing, the protruding amount is set in the range of 0.002 mm to 0.1 mm.

With the invention in the eighth aspect as constructed above, in the seventh aspect, the cutting edge portion made of a high-hardness material with the thickness in the range of 0.2 mm to 2 mm is in one body with, or a separate body from, the support portion made of a high-hardness material and bodily protrudes therefrom in the range of 0.002 mm to 0.1 mm.

Thus, when the cutting tip is pushed against a workpiece to perform a cutting, the support portion does not contact the workpiece not to perform a machining action, and even when the wear of the cutting edge portion develops to the thickness in the range of 0.002 mm to around 0.1 mm, the cutting edge portion which is constant in thickness does nothing but goes to be worn, and an increase does not occur in the contact area between the workpiece and the cutting edge portion. Therefore, since the cutting resistance also remains constant not to increase, chipping due to an excess stress exerted on the cutting edge portion does not take place, so that the life of the cutting tip can be extended. Further, since the support portion is made of the high-hardness material and supports the cutting edge portion, the life of the cutting tip can be extended further.

With the invention in the ninth aspect as constructed above, in a forming method of the cutting tip described in the seventh aspect, the protruding amount of the cutting edge portion from an extreme end face of the support portion in the range of 0.002 mm to 0.1 mm is maintained by a machining to partly remove the extreme end face. Thus, since no machining is needed on the cutting edge portion whose edge shape and surface roughness should be maintained to some degrees, the protruding amount can be maintained through an easy machining, thereby resulting in a reduction in cost.

With the invention in the tenth aspect as constructed above, in the first aspect, a lapping finish is implemented on either side or one side of the cutting edge portion, and even if a heat-affected layer exists on either side or one side of the cutting edge portion, it is removed by the lapping finish, so that the effect of preventing chipping of the cutting edge portion becomes more significant.

With the invention in the eleventh aspect as constructed above, in the first aspect, the cutting edge portion has a hard coat formed at a face contacting the workpiece, and even in the case of machining a workpiece made of a high-hardness material, the occurrence of the wear at an early stage of the machining can be suppressed greatly, so that the life of the cutting tip can be extended.

With the invention in the twelfth aspect as constructed above, the cutting tip described in the first aspect is secured on a circumference of a rotationally driven cutting tool body, and even when the rotationally driven cutting tip is brought into contact with a workpiece to cut the workpiece intermittently, the support portion can support the cutting edge portion without exerting a machining action on the workpiece. Further, even when the wear of the cutting edge portion develops, the width of the flank on the cutting edge portion after wear remains constant at all times. Therefore, since the contact area with the workpiece does not increase and since the cutting resistance also remains constant not to increase, chipping due to an excess stress exerted on the cutting edge portion does not take place, so that the life of the cutting tip can be extended. Further, where a plurality of cutting tips are provided on the circumference at an extreme end of a rotationally driven cutting tool body, they are desirable to be attached to the cutting tool body at an even height without irregularity, but such is very difficult actually. However, according to the prevent invention, the cutting edge portion takes such a construction that the same flank shape as the flank shape before wear comes out continuously as the cutting tip initiates a machining and makes the cutting edge worn, and thus, even where the cutting tips are attached at uneven heights relative to a surface to be machined of the workpiece, the width of the flank at the cutting edge portion after wear remains constant at all times. As a result, since the cutting tips brought into contact go to be worn successively, all of the cutting tips lastly become even in height relative to the workpiece. At this time, since the widths $V_B$ of flank wears at the respective cutting edge portions are all same, the plurality of cutting tips go to be worn by the same amount as they are subjected to the same cutting resistance, whereby the heights relative to the workpiece become even at all times. Consequently, it is possible to obtain a precise machining result.

With the invention in the thirteenth aspect as constructed above, since the cutting tip described in the first aspect is detachably secured to the mounting portion, the cutting tip only can be thrown away when the cutting edge portion is worn out, so that a great reduction in cost becomes possible in comparison with those cutting tools in which a mounting portion and a cutting tip have to be thrown away as one body.

With the invention in the fourteenth aspect as constructed above, in the first aspect, since the cutting tip has the edge of the cutting edge portion shaped on a machining apparatus (milling machine or the like) in which the cutting tip is used, it is not required to detach the cutting tool body for a shaping and to attach the cutting tool body again upon completion of the shaping, so that the efficiency can be increased greatly.

With the invention in the fifteenth aspect, by placing a cutting edge portion made of a high-hardness material to take a thin plate shape on a bottom surface of a forming die and by filling, pressing and sintering the mixture of ceramic particles and powder solder on the cutting edge portion, the sintering of the support portion and the joining with the cutting edge portion can be performed simultaneously, so that the time taken for the manufacturing can be shortened. Further, since the jointing is performed as a result that the solder which is a constituent member of the support portion is melted to flow onto an upper surface of the cutting edge portion, the possibility of an interface detachment at the joining surface becomes low, so that the joining strength between the cutting edge portion and the support portion can be increased.

DESCRIPTION OF REFERENCE SYMBOLS

10 . . . bite, 11 . . . cutting tip, 12 . . . shank, 13 . . . cutting edge portion, 14 . . . support portion, 15 . . . bite, 18 . . . cutting tip, 19 . . . shank, 20 . . . cutting edge portion, 21 . . . support portion, 29 . . . cutting tool body, 30 . . . cutting edge portion, 31 . . . support portion, 32 . . . cutting tip, 35 . . . cutting tip, 36 . . . cutting edge portion, 37 . . . support portion, 38 . . . cutting tool body, 40 . . . cutting edge portion, 42 . . . support portion, 44 . . . cutting tip, 45 . . . cutting edge portion, 46 . . . support portion, 47 . . . cutting tip, 48 . . . support portion, 49 . . . cutting edge portion, 61 . . . machining tool, 71 . . . cutting tip, 73 . . . cutting edge portion, 74 . . . support portion, 75 . . . cutting tool body, 82 . . . rotary tool for shaping, 86 . . . cutting tip, $V_A$ . . . protruding amount, $V_B$ . . . width of flank wear, W . . . workpiece.

Figure 1:
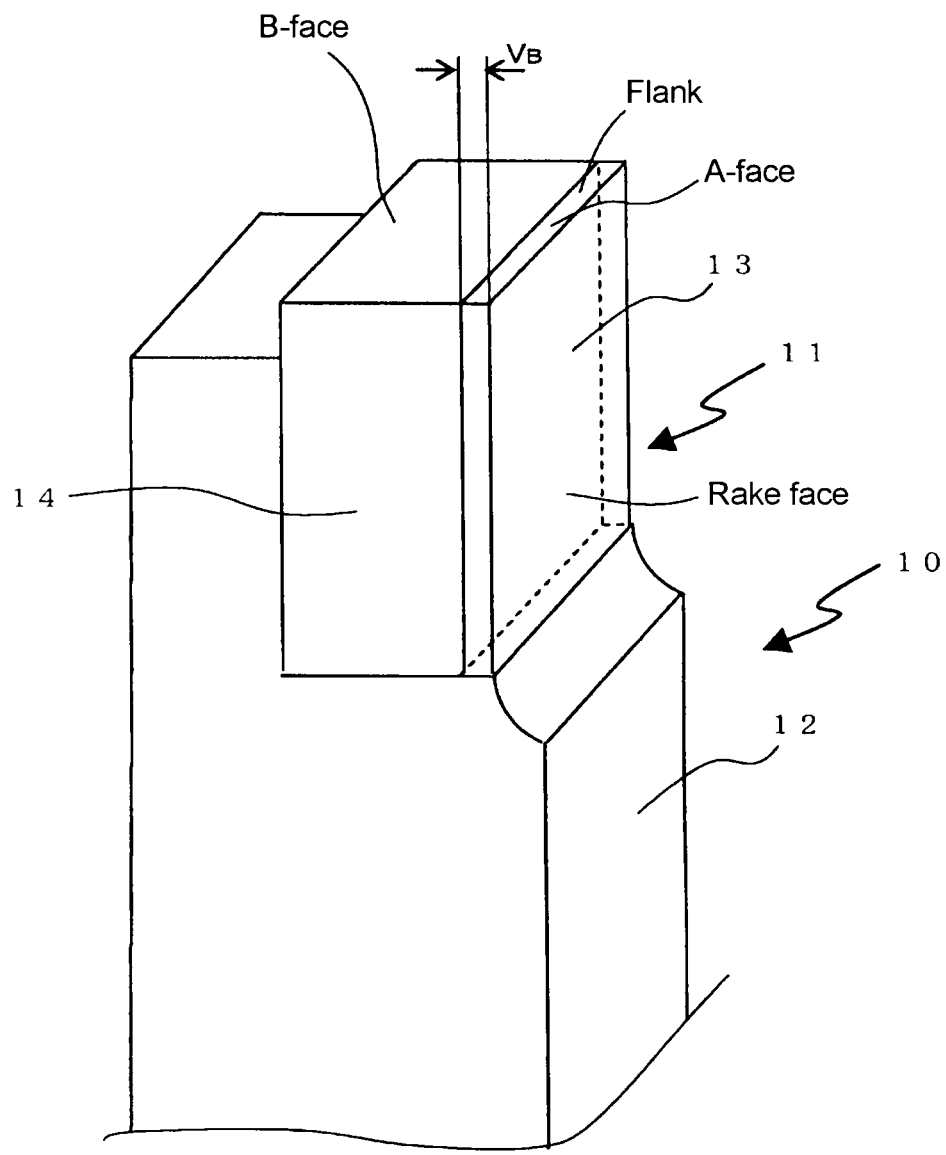
[FIG. 1] is a perspective view of a cutting tip according to a first embodiment.

Preferred Embodiments for Practicing the Invention:

Hereafter, with reference to FIG. 1, description will be made regarding a first embodiment in which a cutting tip according to the present invention is employed for a bite used in a lathe or the like. The bite 10 is used by being attached to a bite holder of a lathe or the like and is composed of a shank portion 12 (mounting portion) secured to the bite holder and a cutting tip 11 brazed to be secured to the shank portion 12.

The cutting tip 11 is composed of a cutting edge portion 13 and a support portion 14 and takes a construction that the cutting edge portion 13 is supported by the support portion 14 on the reverse side of a rake face thereof. The cutting tip 11 is so constituted that an extreme end face B-face of the support portion 14 and an extreme end face A-face of the cutting edge portion 13 become even in height, and is secured with a solder taking sliver solder as chief ingredient so that slide or detachment does not occur between the cutting edge portion 13 and the support portion 14 when an edge of the cutting tip 11 is pushed against a workpiece W to perform a machining. An upper surface of the cutting tip 11 from which cutting chips of the workpiece W are discharged is called as "rake face", and the extreme end face A-face of the cutting edge portion 13 is called as "flank".

The cutting edge portion 13 is a sintered compact which is made of a high-hardness material (e.g., cemented carbide) whose toughness is increased by adding, for example, cobalt Co and nickel Ni to tungsten carbide WC in order to prevent chipping and which takes a thin-plate shape in the range of 0.2 mm to 2 mm in thickness. Where a heat-affected layer exists on either side or one side of the cutting edge portion 13, there is made a cause for chipping during a machining of a workpiece. Therefore, in order to prevent the occurrence of chipping, it is desirable to remove a heat-affected layer by performing a lapping finish if the heat-affected layer exists on either side or one side of the cutting edge portion 13. By so doing, the effect of preventing chipping of the cutting edge portion 13 becomes greater. Further, the effect of preventing the wear of the cutting edge portion 13 can be achieved by coating a hard coat such as TiAlN on the rake face and the flank being the surfaces of the cutting edge portion 13 which contact the workpiece during a machining, by the utilization of CVD (chemical vapor deposition) or PVD (physical vapor deposition).

The support portion 14 is made of a fragile material which is easier to be worn than the cutting edge portion 13. The support portion 14 is a sintered compact which is made by mixing and baking, for example, powdered alumina ($Al_2O_3$) being ceramic particles and solder including powered sliver solder as chief ingredient. At this time, because it is required that the support portion 14 be easier to be worn than the cutting edge portion 13 and that the cutting edge portion 13 be supported as being reinforced in terms of strength, the ceramic particles in the support portion 14 have to be easy to fall off but to have a strength to support the cutting edge portion 13 while the edge of the cutting tip 11 is pushed against the workpiece W to perform a machining. For this purpose, it is a problem that the ceramic particles are too easy to fall off, and in order to satisfy these cutting conditions, it is desirable that the ceramic particles in the support portion 14 be in the range of #400 to #1200 in particle size and be 30% or less in porosity. Here, the porosity is expressed by:

$$(1-(\text{measured specific gravity}(g/cm^3)/\text{absolute specific gravity}(g/cm^3)))\times 100 \quad \text{(Expression 1)}$$

Further, the same effect can be achieved by replacing the powdered alumina ($Al_2O_3$) being ceramic particles by powdered silicon carbide (SiC) or the like belonging to the same category in terms of porous ceramics.

Next, the cutting tip 11 is manufactured through first to fourth steps noted below.

First Step

First of all, the cutting edge portion 13 being a sintered compact is placed on a bottom of a press forming die. The material of this sintered compact is desired to be a high-toughness and high-hardness material such as cemented carbide or the like.

Second Step

Powdered alumina ($Al_2O_3$) being ceramic particles and solder taking silver solder as chief ingredient which are constituent materials for the support portion 14 are mixed and filled on the top of the cutting edge portion 13 placed at the first step.

Third Step

A pressing at a predetermined pressure is performed in the state of the second step to bodily form the cutting edge portion 13 and the support portion 14.

Fourth Step

Thereafter, a baking is performed under predetermined conditions of temperature and pressure. At this time, the solder taking as chief ingredient the powdered sliver solder being the main constituent material for the support portion 14 is melted to flow on the upper surface of the cutting edge portion 13 remaining placed. Thus, since the cutting edge portion 13 is joined with the silver solder being a main ingredient of the constituent material for the support portion 14, a problem such as interfacial detachment or the like at the joining surface hardly takes place. At the same time, in the support portion, the powered sliver solder is melted to join with the alumina ($Al_2O_3$) being ceramic particles and forms the support portion 14. In this way, the cutting tip 11 is completed.

The cutting tip 11 formed in this way is brazed on the shank 12 (mounting portion), whereby the bite 10 used as a cutting tool in a lathe or the like is constructed. The bite 10 constructed in this way is attached to, for example, a bite holder of the lathe and is infed against a workpiece being rotationally driven to perform a cutting on the workpiece W.

Next, the operation will be described. In the cutting tip 11 according to the first embodiment, the support portion 14 is constituted with a fragile material which is easy to be worn in contact with the workpiece W, and thus, when the edge of the cutting tip 11 is pushed against the workpiece W to perform a machining, the cutting edge portion 13 and the support portion 14 are worn simultaneously to remain even in height at all times. The support portion 14 is constituted to fall off in the unit of a ceramic particle when the ceramic particles receive a cutting resistance which exceeds a predetermined value in force, and thus, does not exert a machining action on the workpiece W. Therefore, as shown in FIG. 1, since the width $V_B$ of flank wear on the cutting edge portion 13 is maintained constant at all times and since the cutting resistance exerted on a contact surface with the workpiece W does not increase, chipping due to an excess stress exerted on the cutting edge portion does not take place, so that the life of the cutting tip 11 can be extended. Further, since the heat-affected layer has been removed from the cutting edge portion 13 by implementing a lapping finish thereon, the occurrence of chipping can be prevented more reliably, so that the life of the cutting tip 11 is extended further. Additionally, the flank and the rake face of the cutting edge portion 13 have been coated with a hard coat such as TiAlN by the utilization of CVD (chemical vapor deposition) or PVD (physical vapor deposition), the effect of preventing the cutting edge portion 13 from being worn can be achieved, so that a further extension of the life can be realized.

Further, in the cutting tip 11, since the support portion 14 is made of a fragile material which is easy to be worn and since the cutting edge portion 13 is also made of a cemented carbide taking the form of a thin plate, it is possible to alter the edge shape through a simple machining. Therefore, it is possible to easily make a so-called formed cutting tip which is made to conform the edge shape of the cutting tip to a shape to be machined on a workpiece, though in the past such a formed cutting tip has heretofore been made with a long time spent by making an order outside. Thus, the edge shape of the cutting edge portion of the formed cutting tip can machine the workpiece to approximately the same shape as the edge shape, and the cutting edge portion and the support portion are easy to be maintained in the initial shapes though worn in due course, so that the life of the cutting tip can be extended. Further, the shape of the formed cutting tip becomes easy to generate, and the generation of an arbitrary shape becomes possible even on the machine. Further, the alteration of the edge shape can be made easily whenever required, so that the efficiency can be enhanced.

Figure 2:
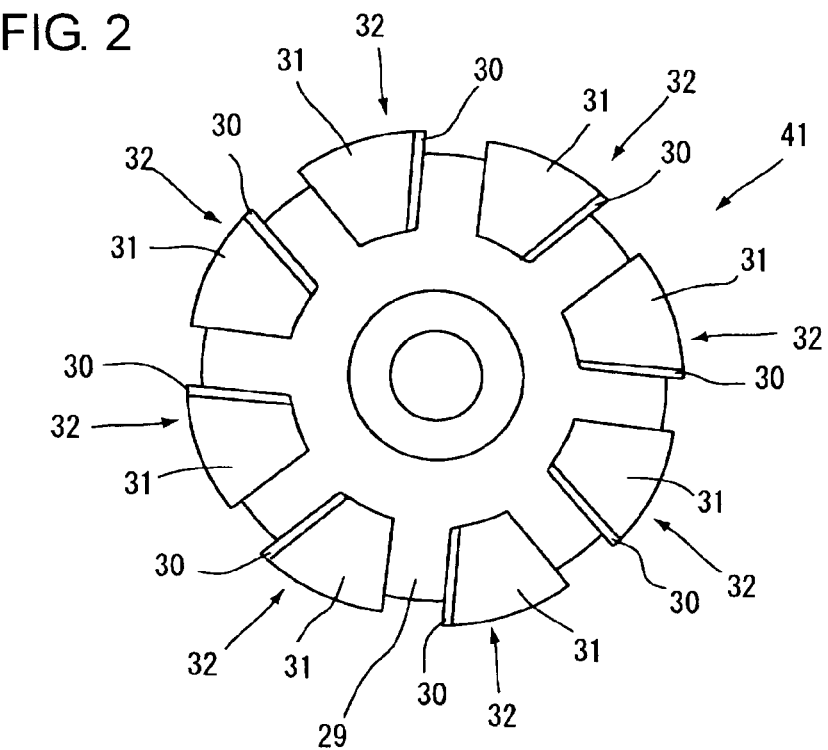
[FIG. 2] is an undersurface view of a milling tool according to a second embodiment.
Figure 3:
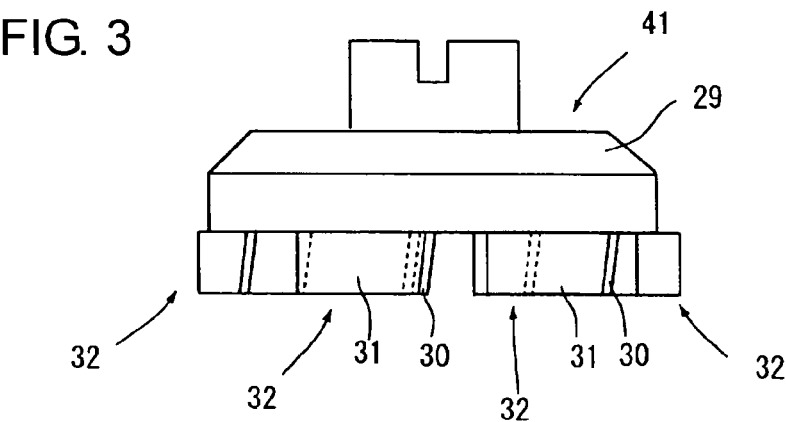
[FIG. 3] is a side view of the milling tool according to the second embodiment.
Figure 4:
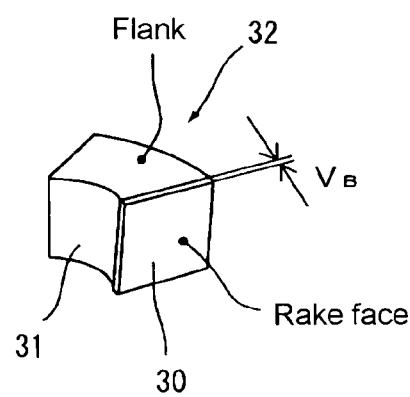
[FIG. 4] is a perspective view of a cutting tip according to the second embodiment.

Next, description will be made regarding a second embodiment in which cutting tips according to the present invention are used in a milling tool used in a milling machine or the like (FIGS. 2 to 4). A rotationally driven milling tool such as milling cutter, reamer, end mill or the like has more than one cutting tips, that is, eight cutting tips in the second embodiment, secured to the outer circumference at an end surface of a cutting tool body and machines a workpiece intermittently.

In FIG. 2, the cutting tips 32 each correspond to the cutting tip 11 in the first embodiment, and a milling tool 41 is constructed by respectively securing the eight cutting tips 32 to the cutting tool body 29 (mounting portion) which corresponds to the shank 12 (mounting portion) of the bite 10 in the first embodiment, by fastening means of screws or the like. As shown in FIGS. 2 to 4, the cutting tip 32 is composed of a cutting edge portion 30 and a support portion 31, which are the same in materials, manufacturing method and the like as those of the cutting tip 11 in the first embodiment. The support portion 31 is made of a fragile material (alumina $Al_2O_3$+silver solder), and when the edge of the cutting tip 32 intermittently contacts the workpiece W to perform a machining, the cutting edge portion 30 and the support portion 31 are made to be worn at the same rate of depth simultaneously. However, the support portions 31 do not exert a machining function on the workpiece, because they are configured to fall off in the unit of a ceramic particle when the cutting resistance acting on the ceramic particles exceeds a predetermined value.

Therefore, the width $V_B$ of flank wear on the cutting edge portion 30 remains constant at all times, and the cutting resistance acting on the contact surface with the workpiece W remains constant not to increase, so that an excess stress is not exerted on the cutting edge portion 30. Further, since heat-affected layers have been removed by lapping finish from either side of the cutting edge portion 30, the same does not suffer from chipping, so that the lives of the cutting tips 32 can be extended. Additionally, the flank and the rake face of the cutting edge portion 30 have been coated with a hard coat such as TiAlN by the utilization of CVD (chemical vapor deposition) or PVD (physical vapor deposition), the effect of preventing the cutting edge portion 30 from being worn can be achieved, so that a further extension of the life can be realized.

In the milling tool 41 with the eight cutting tips 32 shown in FIGS. 2 and 3, it is very difficult to attach all of the cutting tips 32 at an even height relative to a surface to be machined of a workpiece W. However, in the cutting tips according to the present invention, because there is taken a construction that lets the cutting edges be worn, wear begins from a cutting tip 32 which first contacts the workpiece W, that is, from the cutting edge portion 30 and the support portion 31 of a cutting tip 32 which is attached at the closest distance to the surface to be machined, then cutting tips brought into contact go to be worn successively and finally, all of the cutting tips 32 become even in height relative to the workpiece W. At this time, since the wear widths $V_B$ of the flanks on all of the cutting tips 32 are the same, the eight cutting tips 32 go to be worn by the same amount as they receive cutting resistances of the same strength, and can be maintained even in height relative to the workpiece W at all times. As a consequence, it is possible to obtain a machining result which is high in accuracy.

Although in the second embodiment, the cutting tips 32 are secured to an end surface of the cutting tool body 29, a third embodiment regarding cutting chips which are attached to an outer circumference of a cutting tool body and in which when the edges of the cutting tips 32 become rough, the edges of the cutting tips are shaped by a shaping device on a machining apparatus on which the cutting tips are being used will be described with reference to FIGS. 5 to 8.

Figure 5:
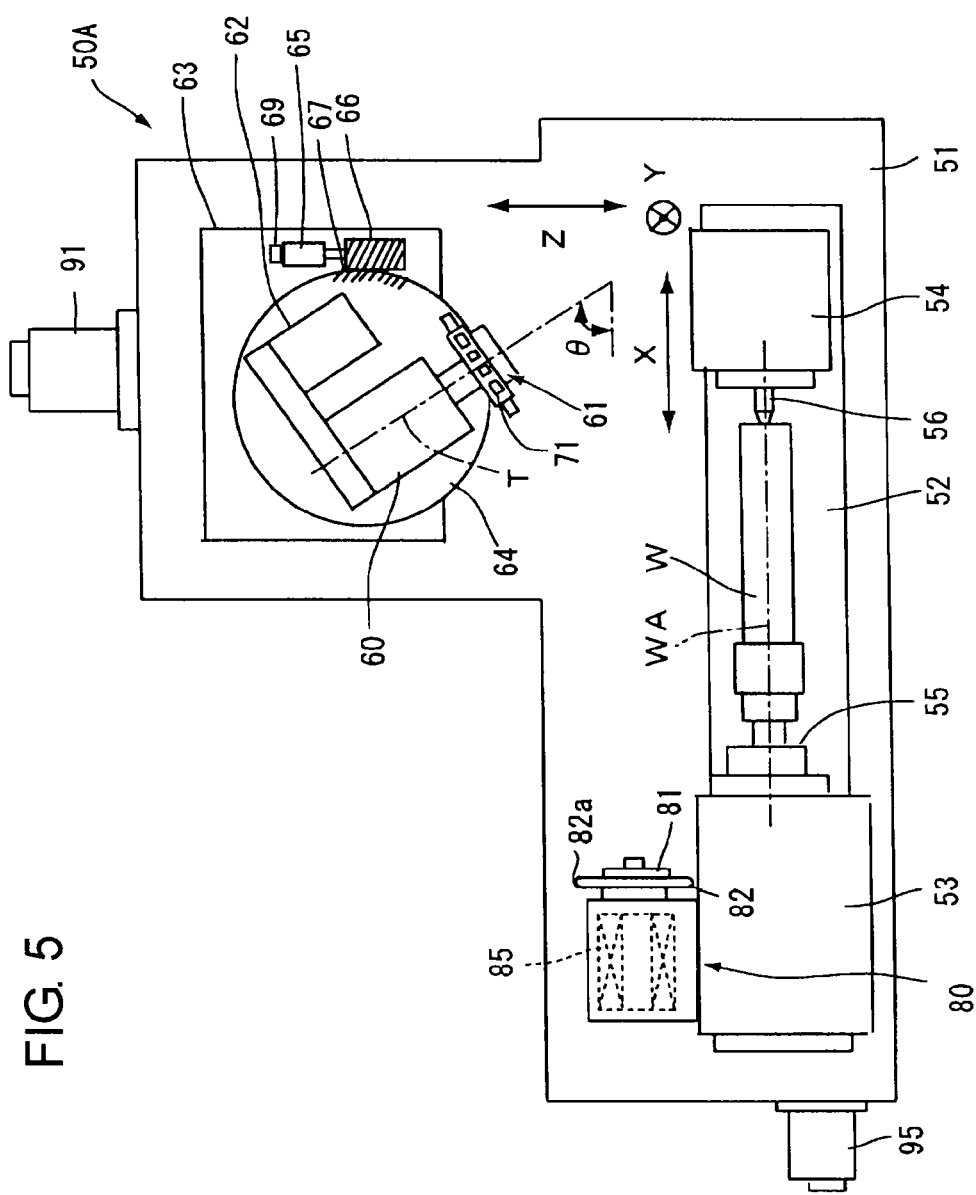
[FIG. 5] is a top view of a machining apparatus incorporating a shaping device according to a third embodiment.

The machining apparatus 50A shown in FIG. 5 is a machining apparatus not only capable of cutting a workpiece W with cutting tips 71 but also capable of shaping the cutting tips 71. On a bed 51 of the machining apparatus 50A, a table 52 is guided and supported to be movable in a horizontal X-axis direction. On the table 52, a work head 53 and a foot stock 54 are arranged to face each other. The work head 53 is provided with a chuck 55 for gripping one end of the workpiece W, while the foot stock 54 is provided with a center 56 for supporting the other end of the workpiece W. The workpiece W is supported by the chuck 55 and the center 56 at opposite ends thereof to be rotatable about an axis parallel to the X-axis direction and is rotationally driven by the chuck 55.

Further, on the bed 51, a tool head 60 is guided and supported to be movable in a horizontal Z-axis direction perpendicular to the X-axis direction and to be rotatable about a vertical Y-axis perpendicular to the X-axis and Z-axis directions. Specifically, a movable table 63 movable in the Z-axis direction is arranged on the bed 51, a rotary table 64 rotatable about the Y-axis and a Y-axis servomotor 65 are arranged on the movable table 63, and the tool head 60, a tool drive motor 62 and the like are arranged on the rotary table 64. A worm 66 is fitted on a rotational spindle of the Y-axis servomotor 65. A worm wheel 67 meshing with the worm 66 is formed on a side edge of the rotary table 64.

On the tool head 60, a machining tool 61 is supported to be rotatable about a tool axis T which makes a predetermined inclination angle δ with a workpiece axis WA of the workpiece W. The machining tool 61 is rotationally driven about the tool axis T by the tool drive motor 62 through a belt-transmission mechanism. Further, together with the rotary table 64 and the tool head 60, the machining tool 61 is rotationally driven by the Y-axis servomotor 65 about the Y-axis.

Figure 8:
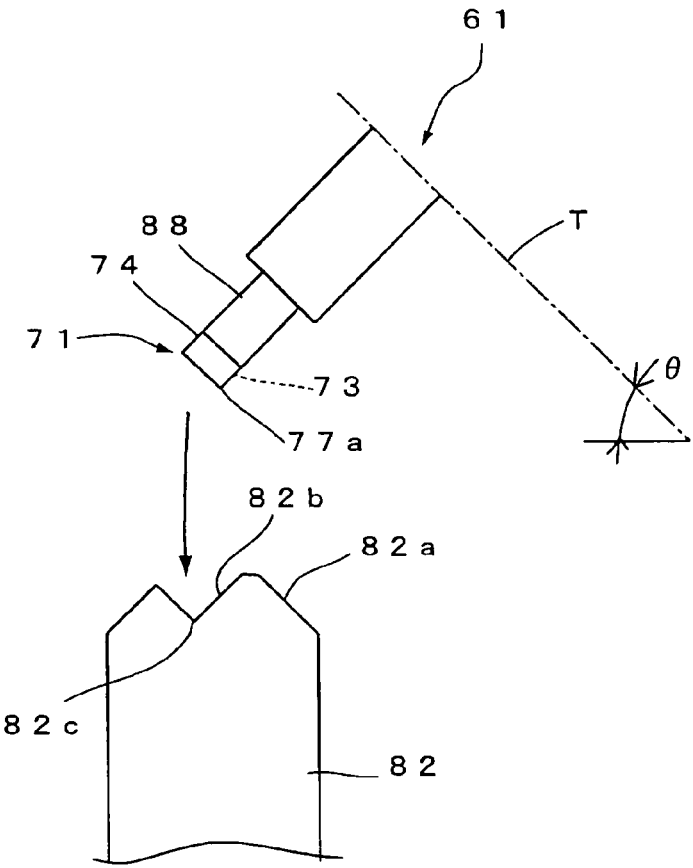
[FIG. 8] is a detailed plan of a shape formed by the shaping device in FIG. 5.

The work head 53 is provided with a shaping device 80 for shaping the edges of the cutting tips 71. The shaping device 80 is provided with a thin-width shaping rotary tool 82 attached to one end of a rotatable truer spindle 81. The truer spindle 81 is rotatably drivable by a built-in motor 85. A cylindrical shaping surface 82*a* is provided on the circumferential surface of the shaping rotary tool 82, and it is possible to shape the cutting tips 71 at the shaping surface 82*a*. Further, as shown in FIG. 8, the shaping surface 82*a* is able to simultaneously shape an extreme end face and one side face with a cutting end edge 77*a* therebetween on each cutting tip 71 of the machining tool 61 whose tool axis T is inclined at the predetermined angle θ. The shaping surface 82*a* is constituted by a formed grinding wheel with a groove 82*b* formed on the shaping surface 82*a* and uses the smallest-diameter portion 82*c* in the groove 82*b* to shape the cutting end edge 77*a*.

Figure 6:
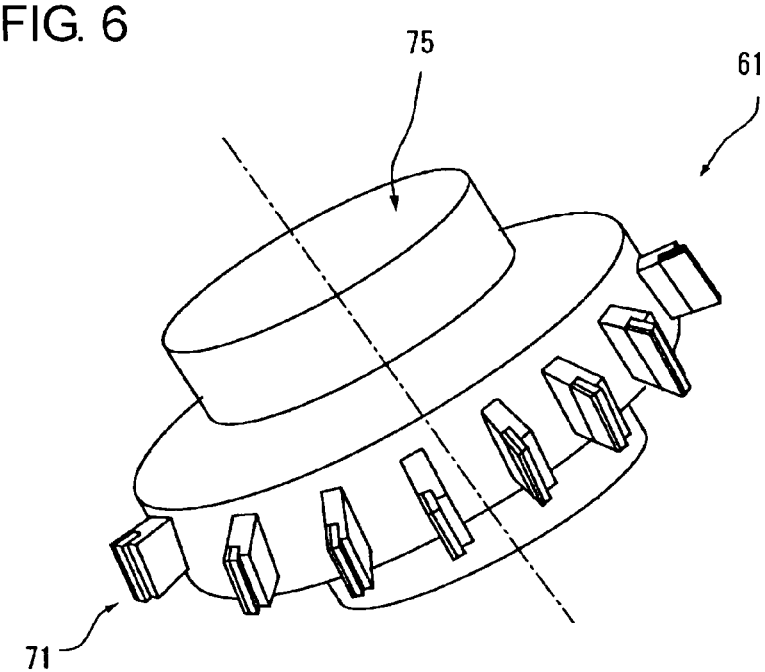
[FIG. 6] is a perspective view showing a cutting tool body in FIG. 5.
Figure 7:
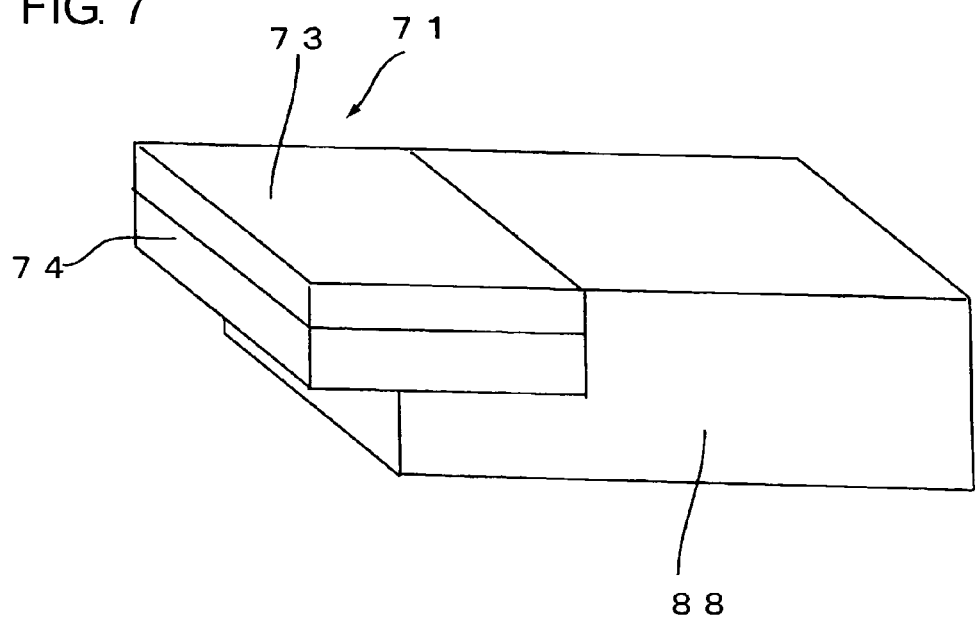
[FIG. 7] is a perspective view showing a cutting tip according to the third embodiment.

In the machining tool 61, as shown in FIGS. 6 and 7, the cutting tips 71 each composed of a cutting edge portion 73 and a support portion 74 and high-hardness milling tip bodies 88 (for example, made of cemented carbide) are secured to each other and are secured on an outer circumference of a cutting tool body 75 at an equiangular interval. That is, the cutting tips 71 are secured to the outer circumference of the cutting tool body 75 through the milling tip bodies 88.

The cutting tip 71 shown in FIG. 7 is the same in construction as the cutting tip 11 described in the first embodiment and is manufactured in the same manufacturing method to perform the same operation and effect as those described in the first embodiment.

Next, the shaping operation will be described. By driving the X-axis and Z-axis servomotors 95, 91, the table 52 and the tool head 60 are controlled to move in the X-axis direction and the Z-axis direction, whereby the cutting edge portion 73 of one cutting tip 71 is positioned to a position to correspond to the shaping surface 82*a* of the shaping rotary tool 82. Then, the Z-axis servomotor 91 is driven to advance the tool head 60 toward the table 52 side. After it is detected by a predetermined means that the cutting edge portion 73 of one cutting tip 71 has come into contact with the shaping surface 82*a* of the shaping rotary tool 82, a further advance to a predetermined advance position is given to shape the cutting edge portion 73 of one cutting tip 71 by an infeed amount corresponding to the advance. Subsequently, the machining tool 61 is rotated through one turn at a low speed. Thus, the cutting edge portions 73 of all of the cutting tips 71 are shaped by being infed by the aforementioned infeed amount against the shaping rotary tool 82, whereby the control for shaping is terminated. Consequently, the time which would otherwise be taken to detach the machining tool 61 from the machining apparatus for shaping the edges of the cutting tips 71 and to attach the same again to the machining apparatus upon completion of the shaping is reduced, so that the machining can be advanced efficiently.

Next, description will be made regarding a so-called formed cutting tip according to a fourth embodiment wherein the edge shape of the cutting tip is made to conform to a groove shape (a shape to be machined) on a workpiece W. Since the manufacturing method of the cutting tip is substantially the same as that in the third embodiment, description of the same portions will be omitted, and modified respects only will be described hereinafter.

Figure 9:
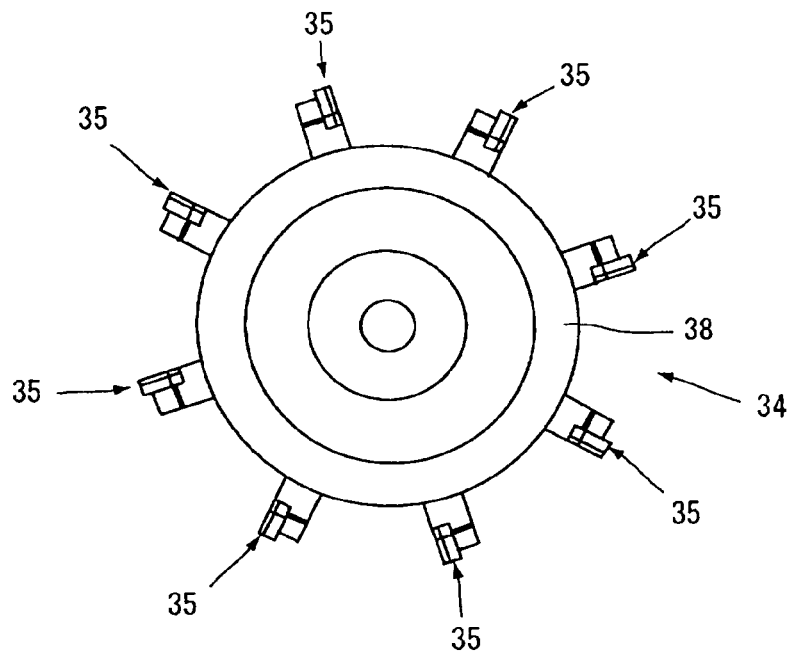
[FIG. 9] is an undersurface view of a milling tool securing formed cutting tips according to a fourth embodiment.
Figure 10:
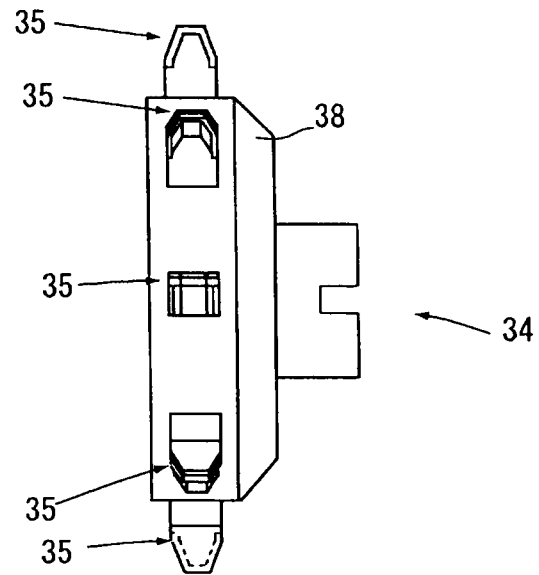
[FIG. 10] is a side view of the milling tool in FIG. 9.
Figure 11:
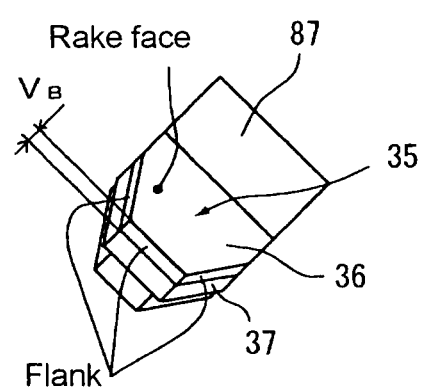
[FIG. 11] is a perspective view of a cutting tip secured to the milling tool in FIG. 10.

As shown in FIG. 9 through FIG. 11, in the fourth embodiment, eight cutting tips 35 are secured by fastening means of screws or the like on an outer circumference of a cutting tool body 38 through cutting tip bodies 87 to constitute a milling tool 34. The cutting tips 35 are so-called formed cutting tips which have the shape of their edges formed to be the same as the groove shape (the shape to be machined) on the workpiece W.

With rotation of the milling tool 34, the eight cutting tips 35 secured to the outer circumference of the cutting tool body 38 through the cutting tip bodies 87 machine the workpiece W intermittently, whereby the edge shape of the cutting tips 35 is transferred as it is to the workpiece W.

Therefore, because the edge shape of the cutting tips 35 approximates a finish machining shape required to the workpiece W, it is unnecessary to perform the machining many times, so that the machining time can be reduced greatly. Further, the edge shape of the cutting edge portions 36 is able to machine the workpiece W to approximately the same shape as the edge shape, and thus, the cutting edge portions 36 and the support portions 37 are easy to keep their initial shapes, so that the lives of the cutting tips can be extended. Further, since generating the shape of the formed cutting tips is easy, it becomes possible to generate an arbitrary shape even on the machine. Furthermore, since the alteration of the edge shape can be done easily whenever required, the efficiency can be enhanced.

Figure 12:
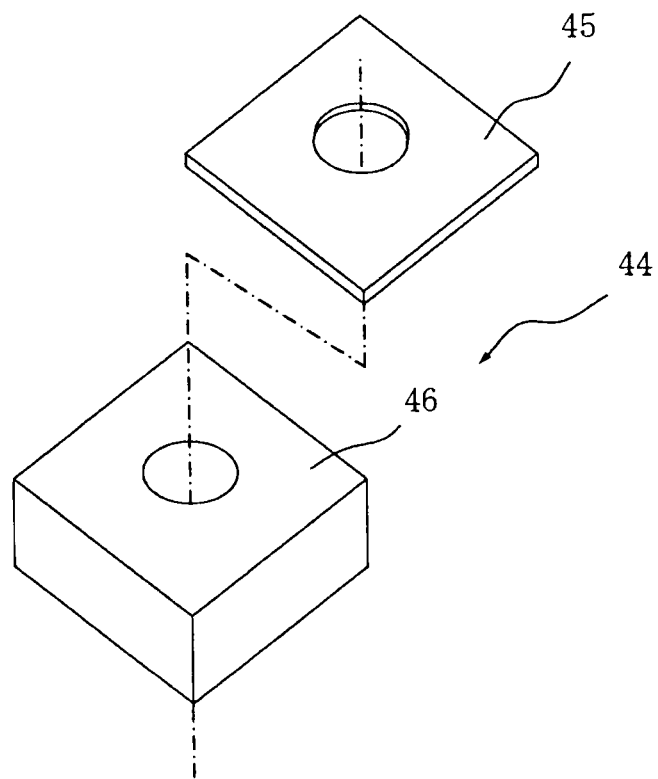
[FIG. 12] is a perspective view of a throw-away tip according to a fifth embodiment.

Next, a cutting tip in a fifth embodiment according to the present invention will be described. The fifth embodiment is directed to a cutting tip 44 as throw-away tip used in a tool of the type in which a tip portion only is replaced (FIG. 12). The cutting tip 44 is the same in construction as the cutting tip 11 in the first embodiment and is composed of a cutting edge portion 45 and a support portion 46. Further, like the first embodiment, it is desirable that if a heat-affected layer exists on either side or one side, a lapping finish be implemented to remove the heat-affected layer. Further, since a hard coat such as TiAlN has been coated on the flank and the rake face of the cutting edge portion 45 by the utilization of CVD (chemical vapor deposition) or PVD (physical vapor deposition), the effect of preventing the wear of the cutting edge portion 45 can be attained, so that the life can be extended further.

Figure 13:
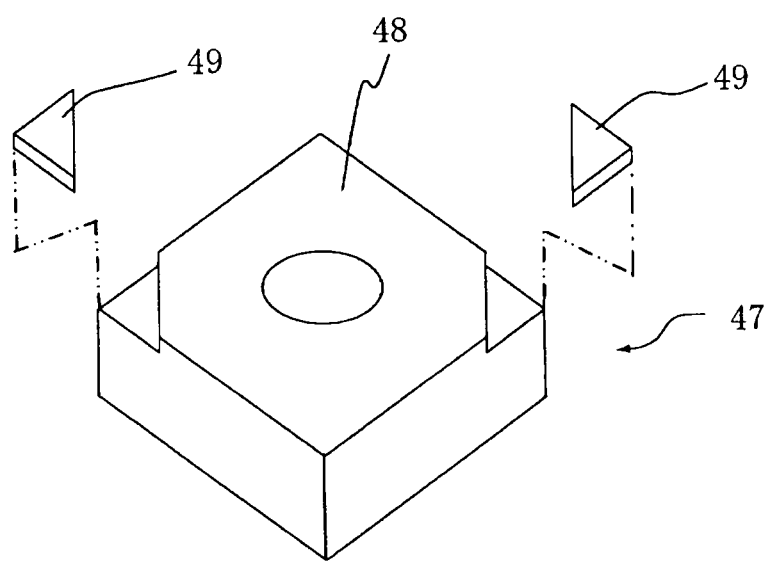
[FIG. 13] is a perspective view of a throw-away tip according to another embodiment.

The cutting tip 44 is manufactured to have the size meeting a tool to which it is attached, and is fixed to a shank by inserting a screw or the like into a center round hole thereof. In this case, when the cutting tool 44 is exhausted to be worn, it is enough to throw away the small cutting tip (throw-away tip) 44 only, so that the cost can be reduced greatly. Further, instead of securing the cutting edge portion 45 and the support portion 46 of the same shape as is the case of the cutting tip 44, a plurality of cutting edge portions 49 may be secured by brazing to parts of a support portion 48 to constitute a cutting tip 47 shown in FIG. 13.

In the foregoing first to fifth embodiments, the members constituting the respective support portions are made of fragile materials which are easy to be worn in contact with a workpiece W, but this fact does not limit the present invention. It is possible to use materials meeting respective support portions and being easier to be worn than the respective cutting edge portions, in which case there may be used aluminum, copper, resin or the like. However, because of needing functions of supporting the respective cutting edge portions associated therewith and of preventing breakage, the respective support potions should satisfy a prescribed strength, and therefore, should be high in the strength of the material itself. Those satisfying the requirements may be, for example, PEEK resin, polyamide resin or the like if resin is used, and may be 5052, 6061 or the like if aluminum is used.

Where the respective members are used for the respective support portions in the foregoing embodiments, as the manufacturing method, the method described in the first embodiment is not used wherein the support portion is made of a sintered compact taking as chief ingredients alumina being ceramic particles and sliver solder and wherein the cutting edge portion is bodily brazed at the same time, and instead, there may be used a method in which a joining is made with a joining member interposed into the boundary between the cutting edge portion and the support portion. In this case, the joining member is desired to be resistant to heat and strong in joining force, and sliver solder, copper solder, nickel solder or the like may be employed for the joining with metals such as aluminum, copper or the like. Further, of epoxy adhesives, one resistant to heat should be employed in the case of resin or the like.

Figure 14:
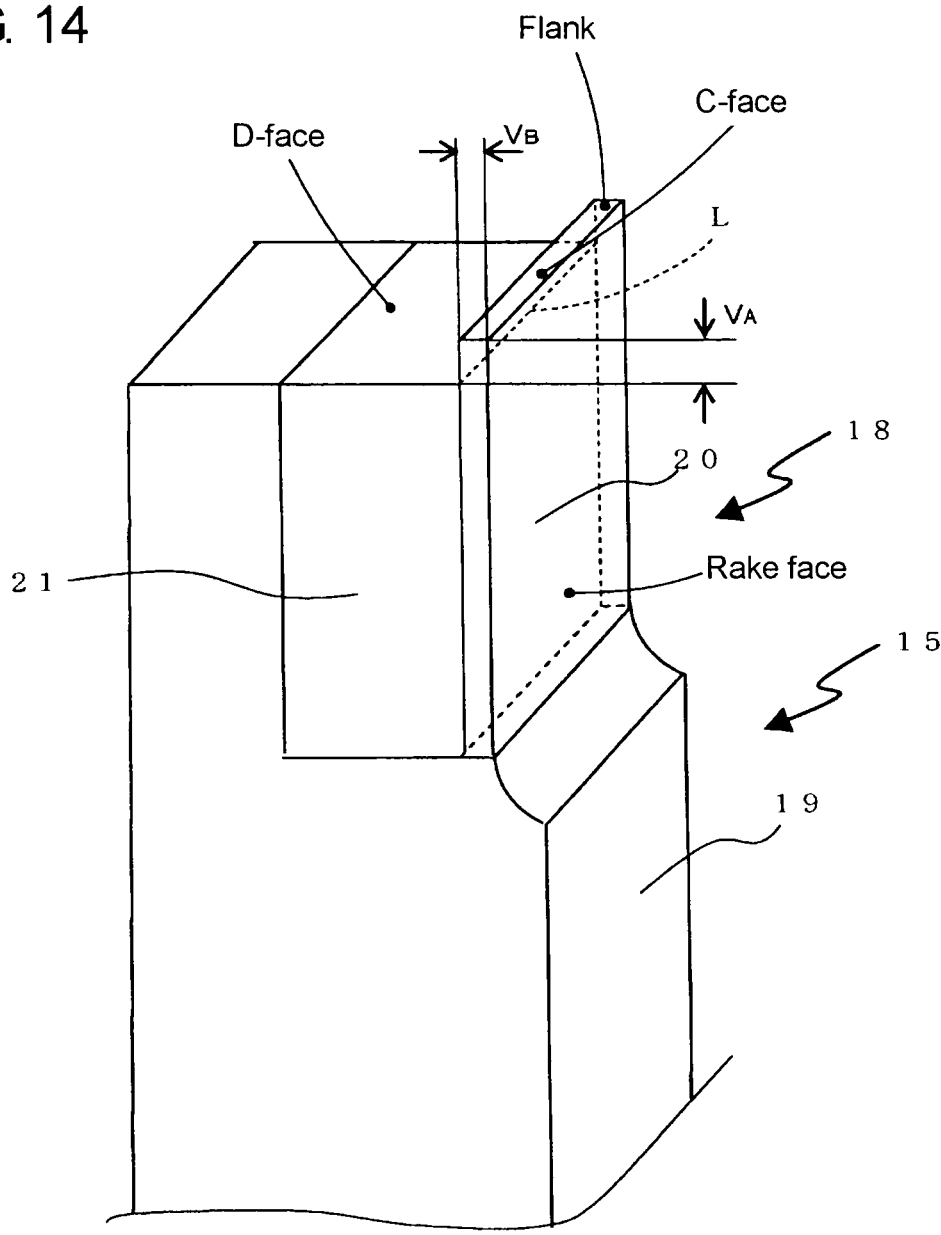
[FIG. 14] is a perspective view of a cutting tip according to a sixth embodiment.

Next, a sixth embodiment according to the present invention will be described with reference to FIG. 14. Like the first embodiment, the sixth embodiment will be described as being applied to a bite (cutting tool) used in a lathe or the like. The bite 15 is one attached and used on a bite holder of the lathe or the like and composed of a shank portion 19 (mounting portion) secured to the bite holder and a cutting tip 18 secured by brazing to the shank portion 19.

The cutting tip 18 is composed of a cutting edge portion 20 and a support portion 21. An extreme end face C-face of the cutting edge portion 20 bodily protrudes in the range of 0.002 mm to 0.1 mm (desirably, in the range of 0.02 to 0.03 mm) from an extreme end face D-face of the support portion 21 supporting the cutting edge portion 20. Further, the cutting edge portion 20 and the support portion 21 are secured with a solder taking silver solder as chief ingredient so that slide or detachment does not occur therebetween when the edge of the cutting tip 18 is pushed against a workpiece W to perform a machining.

The cutting edge portion 20 is a sintered compact which is constituted by a high-hardness material (e.g., cemented carbide) increased in toughness by adding, for example, cobalt Co and nickel Ni to tungsten carbide WC in order to prevent chipping and which takes the shape of a thin plate with a thickness in the range of 0.2 mm to 2 mm.

The support portion 21 requires a prescribed strength in reinforcing and supporting the cutting edge portion 20 in terms of strength when the cutting edge portion 20 machines a workpiece. For this purpose, the material constituting the support portion 21 should be a material possessing a predetermined strength or higher, and the same material as the cutting edge portion 20 is employed in the present embodiment.

The existence of a heat-affected layer on either side or one side of the cutting edge portion 20 may make a cause for chipping at the time of machining a workpiece. Therefore, in order to prevent the occurrence of chipping, if the heat-affected layer exists on either side or one side of the cutting edge portion 20, it is desirable to remove the heat-affected layer by implementing a lapping finish. By doing so, the effect of preventing chipping of the cutting edge portion 20 is further enhanced. Further, the effect of preventing the wear of the cutting edge portion 45 can be achieved by coating a hard coat such as TiAlN on surfaces of the cutting edge portion 20, that is, on the rake face and the flank which contact a workpiece during a machining, by the utilization of CVD (chemical vapor deposition) or PVD (physical vapor deposition).

Next, the operation will be described. The bite 15 constructed in this way is attached and secured at the shank portion 19 (mounting portion) to, for example, a bite holder of a lathe, and the cutting tip 18 is infed against a rotating workpiece W to cut the same.

The extreme end face C-face, that is, the flank of the cutting edge portion 20 constituting the cutting tip 18 protrudes by a protruding amount $V_A$ in the range of 0.002 mm to 0.1 mm from the extreme end face D-face of the support portion 21. Thus, during the machining of the workpiece, the extreme end face D-face of the support portion 21 does not contact the workpiece W, and when the edge of the cutting tip 18 is pushed against the workpiece W to perform a machining, the extreme end edge only of the cutting edge portion 20 goes to be worn. Thus, as shown in FIG. 14, the width $V_B$ of flank wear on the cutting edge portion 20 remains constant at all times until the wear reaches to a position close to the extreme end face D-face of the support portion 21, during which time the cutting resistance acting on the contact surface with the workpiece W does not increase, and thus, it does not occur that the cutting edge portion 20 is chipped due to an excess stress exerted thereon. Therefore, while the cutting edge portion 20 goes to be worn, it can continue to machine the workpiece, so that the life of the cutting tip 18 can be extended. The protruding amount $V_A$ in the range of 0.002 mm to 0.1 mm is that acquired through experiments, and if the protruding amount $V_A$ is less than 0.002 mm, it is likely that when the cutting tip is pushed against a workpiece to perform a cutting, the support portion contacts the workpiece to serve for the machining action. Further, if the protruding amount $V_A$ is greater than 0.1 mm, it is likely that when the extreme end portion of the cutting edge portion 20 machines the workpiece, an excess bending stress is generated at a boundary portion L between the cutting edge portion 20 and the support portion 21 to result in the breakage of the cutting edge portion 20. From the foregoing, the protruding amount $V_A$ is set in the range of 0.002 mm to 0.1 mm.

In the sixth embodiment, the bite 15 is composed of the shank portion 19 (mounting portion) attached to the bite holder and the cutting tip 18 secured by brazing to the shank portion 19. Without being limited to this, it is possible to make the support portion constituting the cutting tip 18 act the function of a shank and to secure the support portion on the bite holder.

Further, in the sixth embodiment, since a lapping finish is implemented on the cutting edge portion 20 to remove a heat-affected layer therefrom, the occurrence of chipping can be prevented more reliably, so that the life of the cutting tip 18 can be extended further. Further, since a hard coat such as TiAlN is coated on the flank and the rake face of the cutting edge portion 20 by the utilization of CVD (chemical vapor deposition) or PVD (physical vapor deposition), the effect of preventing the wear of the cutting edge portion 20 is achieved, so that the life can be extended further.

Further, in the sixth embodiment, when machining workpieces W over a predetermined period of time causes the cutting edge portion 20 to be worn and causes the extreme end face C-face of the cutting edge portion 20 reach a position close to the extreme end face D-face of the support portion 21, the life of the cutting tip 18 is judged to have expired, whereupon the cutting tip 18 may be thrown away. However, the reuse may be possible by machining the extreme end face D-face of the support portion 21 to remove a part thereof for revive the initial state, that is, by machining the extreme end face D-face of the support portion 21 to remove a part thereof so that the protruding amount $V_A$ of the extreme end face C-face after such wear of the cutting edge portion 20 protruding from the extreme end face D-face of the support portion 21 becomes in the range of 0.002 mm to 0.1 mm. By doing so, the life can be extended with a reduction in cost. At this time, the machining to partly remove the extreme end face D-face of the support portion 21 may be carried out outside of the machining apparatus with the bite 15 detached or may be carried out with the bite 15 remaining attached to the machining apparatus. In either case, the method of the removal machining may be implemented by machining, electromechanical machining, electrodischarge machining or the like.

Figure 15:
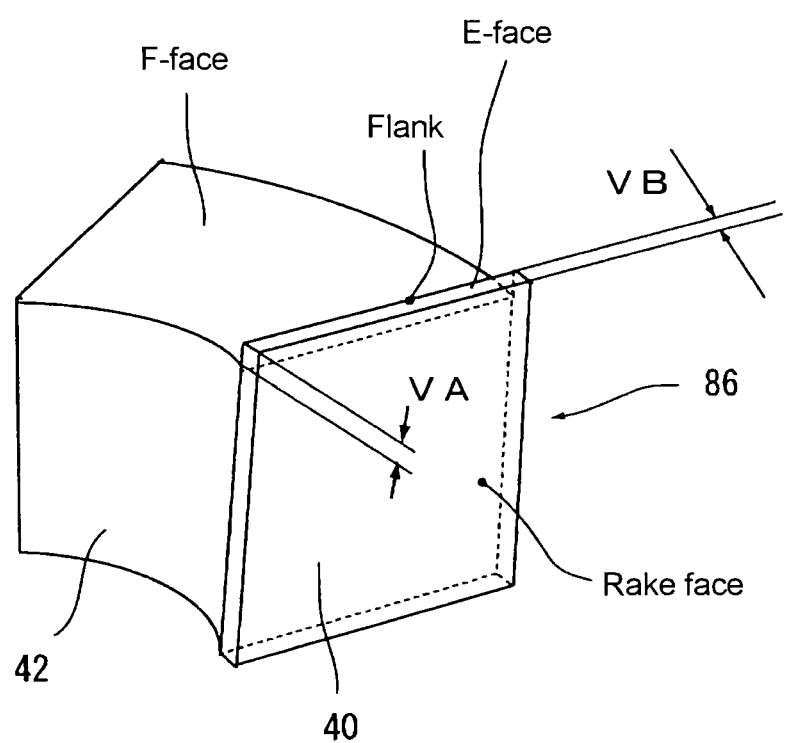
[FIG. 15] is a perspective view of a cutting tip for a milling tool according to another embodiment.

Further, as a different form of the sixth embodiment, in a plurality of cutting tips which are used with themselves secured to an end surface of a rotationally driven cutting tool for a milling machine or the like, as is the case of a cutting tip 86 shown in FIG. 15, an extreme end face E-face of the cutting edge portion 40 made of a cemented carbide may be protruded by a protruding amount VA in the range of 0.002 mm to 0.1 mm from an extreme end face F-face of a support portion 42. In this case, the edges of the plurality of the cutting edge portions 40 continue to machine the workpiece as they are worn out, until the wears of the extreme end portions of the cutting edge portions 40 cause the extreme end faces E-faces to reach the extreme end faces F-faces of the support portions 42. Thus, the plurality of cutting edge portions 40 having the same thickness are worn out through the same amount with the same cutting resistance being exerted thereon, and become even in height relative to the workpiece W at all times. Therefore, it is possible to attain a accurate machining result.

Further, when the wears of the cutting edge portions 40 cause the extreme end faces E-faces of the cutting edge portions 40 to reach positions close to the extreme end faces F-faces of the support portions 42, the lives of the cutting tips 86 are judged to have expired, whereupon the cutting tips 86 may be thrown away. However, the reuse may be possible by machining the extreme end faces F-faces of the support portions 42 to remove parts thereof for revive the initial states, that is, by machining the extreme end faces F-faces of the support portions 42 to remove the parts thereof so that the protruding amount $V_A$ of the extreme end faces E-faces after such wears of the cutting edge portions 40 from the extreme end faces F-faces of the support portions 42 becomes a length in the range of 0.002 mm to 0.1 mm. By doing so, the cost can be reduced. At this time, the machining to partly remove the extreme end faces F-faces of the support portions 42 may be carried out outside of the machining apparatus or may be carried out with the cutting tool remaining attached to the machining apparatus. In either case, the method of the removal machining may be implemented by machining, electromechanical machining, electrodischarge machining or the like.

Further, in the sixth embodiment, since the extreme end face C-face of the cutting edge portion 20 protrudes as the protruding amount $V_A$ by the length in the range of 0.002 mm to 0.1 mm (favorably, in the range of 0.02 to 0.03 mm) from the extreme end face D-face of the support portion 21 supporting the cutting edge portion 20, the support portion 21 only acts to support the cutting edge portion 20 without contacting the workpiece W during the machining and does not affect the machining. Thus, as long as the material constituting the support portion 21 is satisfied in terms of strength, it can be chosen from a wide range which runs from common materials (e.g., iron) to high-strength materials (i.e., cemented carbide as used for the cutting edge portions 20), and thus, it becomes possible to realize a reduction in cost or an increase in strength in light of use.

Figure 16:
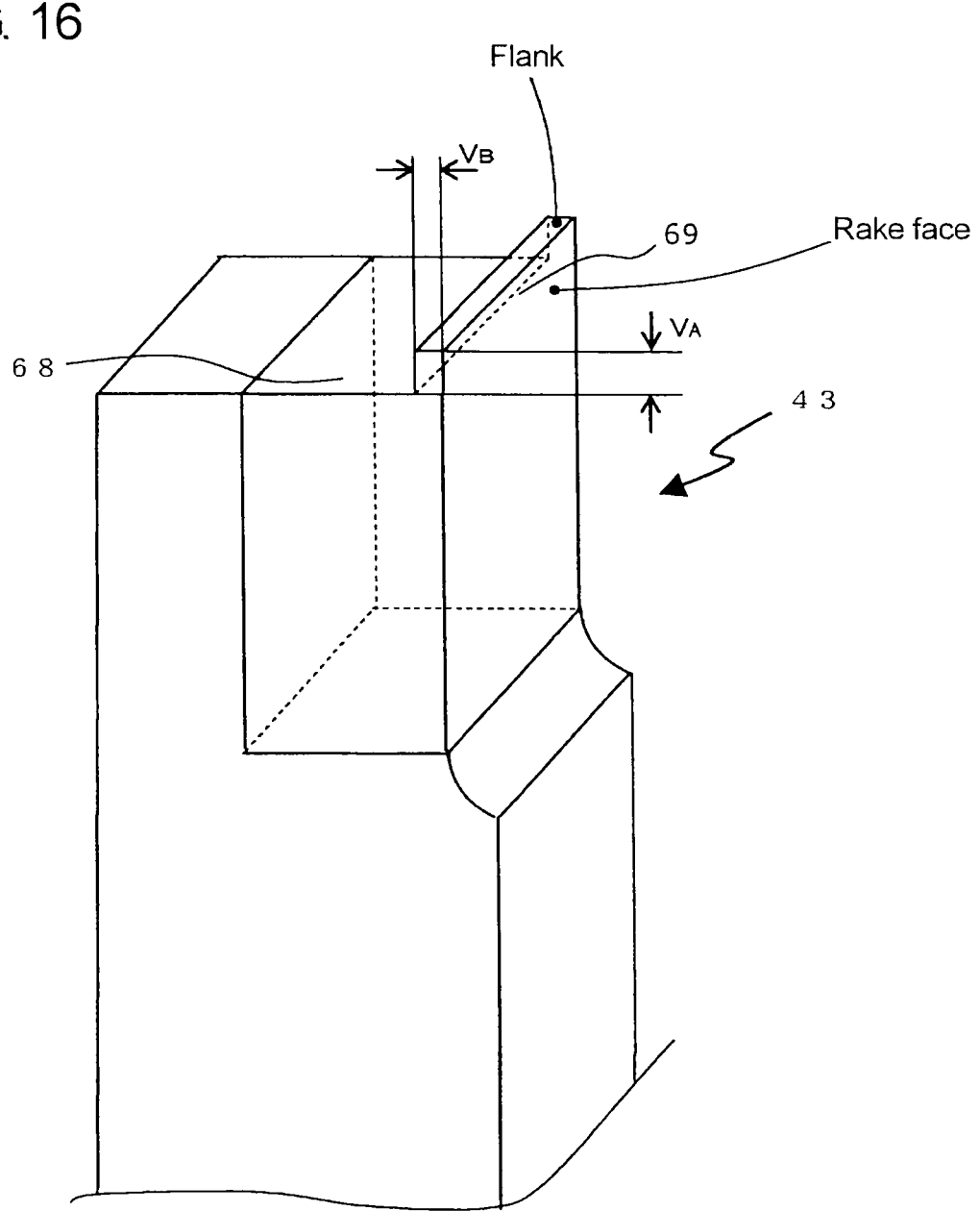
[FIG. 16] is a perspective view of a one-body cutting tip according to another embodiment.
Figure 17:
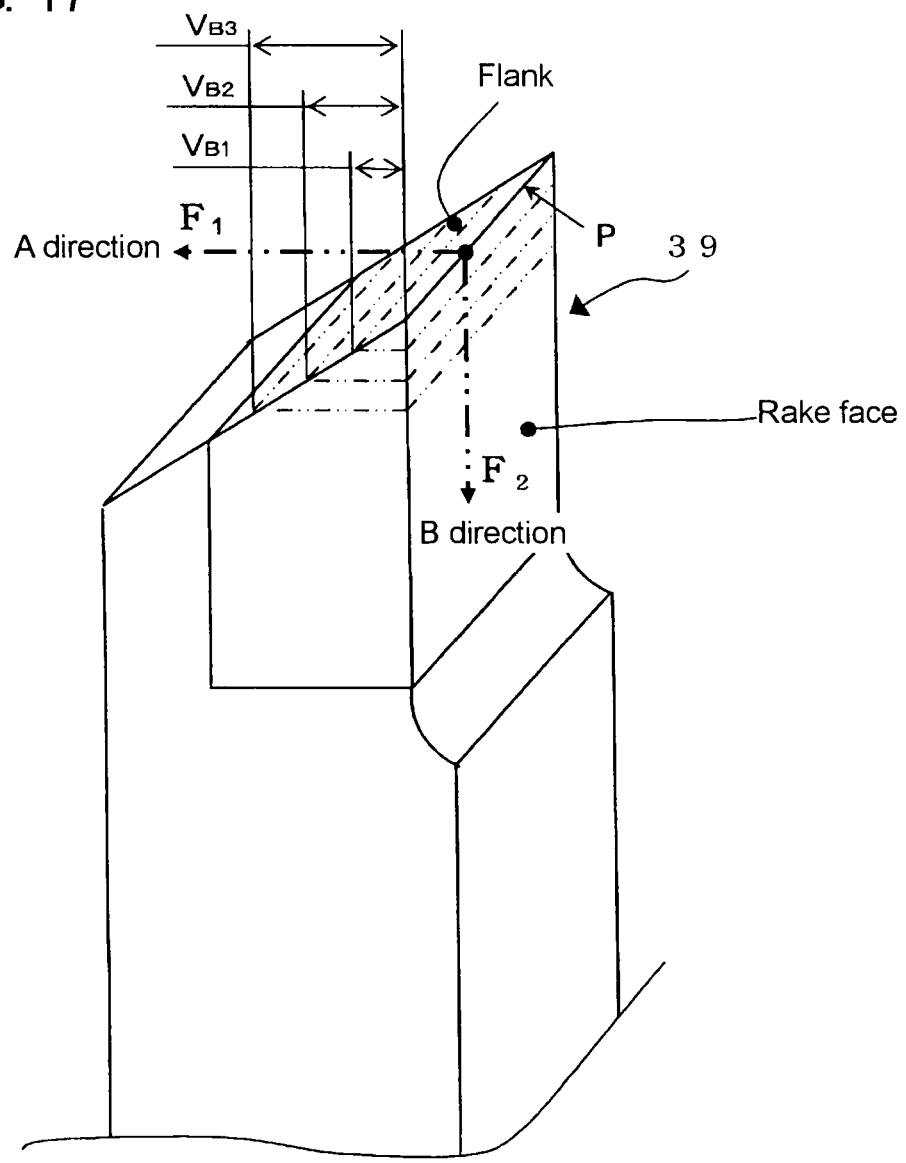
[FIG. 17] is a perspective view showing a cutting tip in the prior art.

In the sixth embodiment, as shown in FIG. 16, a support portion 68 and a cutting edge portion 69 which constitute a bite 43 may be bodily formed with a high-hardness material such as cemented carbide or the like. The operation and the effect are the same as those in the sixth embodiment, and the application is the same as the cutting tip 18.

Industrial Applicability

A cutting tip according to the present invention, extended in life is suitable for use in a cutting machine like lathe, milling machine or the like.

The invention claimed is:

1. A cutting tip comprising:
a cutting edge portion made of a high-hardness material to take a thin-plate shape; and
a support portion made of a fragile material which becomes more worn in contact with a workpiece than the cutting edge portion so as not to exert a machining action on the workpiece when in contact with the workpiece,
wherein the support portion is arranged with respect to the cutting edge portion to secure and support the cutting edge portion on a reverse side of a rake face of the cutting edge portion, and
wherein the fragile support material is a sintered compact comprising a mixture of solder and ceramic particles, wherein the ceramic particles of the support portion are in the range of #400 to #1200 in particle size and 30% or less in porosity.

2. The cutting tip in claim 1, wherein the thickness of the cutting edge portion is in the range of 0.2 mm to 2 mm.

3. The cutting tip in claim 1, wherein the cutting edge portion is brazed with solder to the support portion.

4. The cutting tip in claim 1, wherein the edge shape of the cutting edge portion is machined to a shape conforming to a shape to be machined on the workpiece.

5. The cutting tip in claim 1, wherein the cutting edge portion protrudes from the support portion in the range of 0.002 mm to 0.1 mm.

6. The cutting tip in claim 5, wherein the support portion is made of a high-hardness material and wherein the cutting edge portion is in the range of 0.2 mm to 2 mm in thickness and bodily protrudes from the support portion.

7. A forming method of the cutting tip described in claim 5, wherein an extreme end face of the support portion is machined to be removed to keep a protruding portion protruding in the range of 0.002 mm to 0.1 mm.

8. The cutting tip in claim 1, wherein a lapping finish is implemented on either side or one side of the cutting edge portion.

9. The cutting tip in claim 1, wherein the cutting edge portion has a hard coat formed on a surface thereof which contacts the workpiece.

10. The cutting tip in claim 1, wherein the cutting tip is secured on a circumference of a cutting tool body which is rotationally driven.

11. The cutting tip in claim 1, wherein the cutting tip is detachably secured to a mounting portion of a cutting tool.

12. The cutting tip in claim 1, wherein the cutting tip is subjected to a machining to shape an edge of the cutting edge portion on a machining apparatus on which the cutting tip is used.

13. A manufacturing method of a cutting tip, comprising:
placing a cutting edge portion having a cutting edge, and which is made of a high-hardness material to take a thin-plate shape, on a bottom surface of a die;

forming a support portion by filling and pressing a mixture of ceramic particles and solder on the cutting edge portion placed in the die; and sintering the pressed mixture, wherein the ceramic particles of the support portion are in the range of #400 to #1200 in particle size and 30% or less in porosity.

* * * * *